G. F. CORLE.
ANIMAL TRAP.
APPLICATION FILED JULY 7, 1921.
1,415,801.
Patented May 9, 1922.
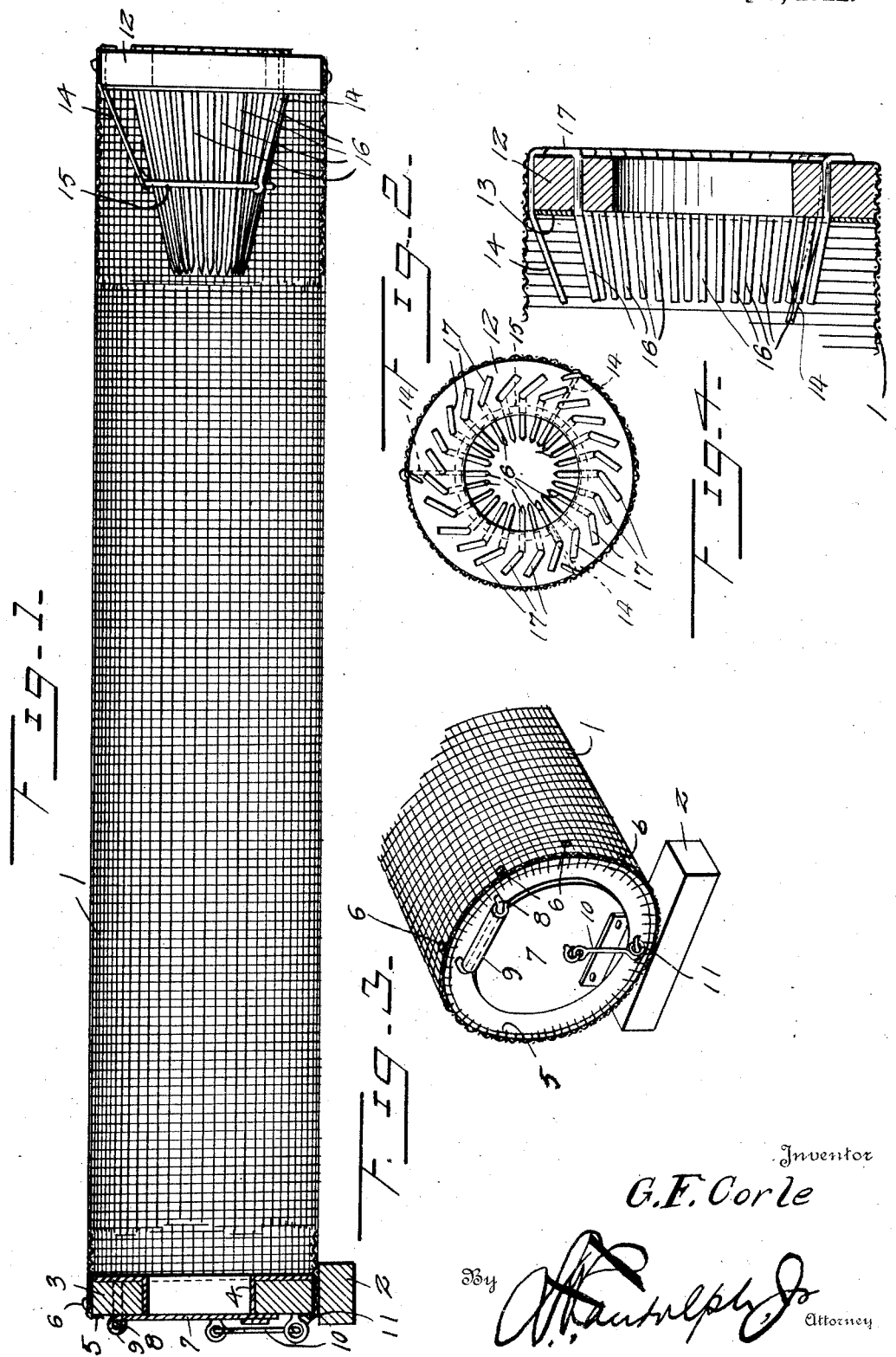

UNITED STATES PATENT OFFICE.

GEORGE F. CORLE, OF BOLTON, KANSAS.

ANIMAL TRAP.

1,415,801. Specification of Letters Patent. Patented May 9, 1922.

Application filed July 7, 1921. Serial No. 482,944.

*To all whom it may concern:*

Be it known that I, GEORGE F. CORLE, a citizen of the United States, residing at Bolton, in the county of Montgomery and State of Kansas, have invented certain new and useful Improvements in an Animal Trap; and I do hereby declare the following to be a full, clear, and exact description of the invention, such as will enable others skilled in the art to which it appertains to make and use the same.

The invention relates to traps of the nature having an entrance opening and a guard associated with and surrounding the entrance opening to prevent the escape of an entrapped animal through the entrance.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is a side view of a trap embodying the invention.

Figure 2 is a front view of the entrance end of the trap,

Figure 3 is a front view of the discharge end of the trap, and

Figure 4 is an enlarged section through the entrance end thereof.

Corresponding and like parts are referred to in the following description and designated in the several views of the drawing by like reference characters.

The trap embodies a body 1 which may be of any construction and configuration. As shown the body 1 is elongated and of cylindrical form and constructed of wire fabric. The trap is designed to lie upon its side and is retained in such position by means of a foot 2 which consists of a bar preferably disposed at one end of the trap. This prevents the trap from rolling when an entrapped animal climbs the side thereof and throws the weight upon one side of the body which under ordinary conditions would tend to cause the trap to roll. A frame is fitted to each end of the body and preferably consists of a ring. In the preferable construction the rings are formed of wood which is adapted to receive the fastening means. The inner faces of the wooden rings are protected by having sheet metal rings or plates applied thereto.

The wooden ring applied to the rear or discharge end of the trap is designated by the numeral 3 and the inner metal facing by the numeral 4. The ring 3 is inserted within the body 1 and an end portion of the body is bent to overlap the outer side as indicated at 5. Brads or tacks 6 are driven into the ring 3 and engage portions of the body 1 and retain the ring in position.

A door 7 closes the rear of the trap and is integrally connected to the frame or wooden ring 3. A relatively wide staple 8 is driven through the ring 3 and the metal facing 4 and the inner ends of its members are upset to retain the staple in position. The door 7 is preferably of sheet metal and is formed with a wing 9 which is bent around the staple 8 and coacts therewith to form the hinge joint. A hook 10 attached to the door 7 cooperates with an eye 11 applied to the ring 3 whereby to hold the door 7 secure when closed.

The frame applied to the entrance end of the trap consists of a wooden ring 12 having an inner metal face 13. The wooden ring 12 is applied to the body 1 in substantially the same manner as the ring 3. As hereinbefore stated a guard cooperates with the entrance and consists of a confining frame and a plurality of rods disposed in a circle and inwardly converged and having their inner ends pointed. The confining frame consists of a plurality of stays 14 and a ring 15. The stays 14 preferably consist of wire which is looped about the ring 15 and has its end portion engaged about the outer portion of the ring 12 and twisted together. The ring 15 is loosely supported in the bight of the stays 14. The pointed rods 16 preferably consist of stout wire and their outer ends are received in openings formed in the ring 12 and are bent laterally as indicated at 17 to lie against the outer side of the ring 12 and limit the inward movement of the rod. The space at the inner end of the guard and defined by the pointed ends of the rods 16 is of such a size as to admit of an animal passing therethrough but prevent its escape after being entrapped, because of the pointed extremities of the rods 16 and the converging arrangement of the latter. After an animal protrudes the head from the guard it cannot withdraw because of the pointed ends of the rods 16 and continues to advance because such forward movement is not impeded by the guard or results in any pricking action of the points of the rods as is the case should the animal attempt to withdraw after partly passing through the guard.

Having thus described the invention, what I claim is:—

1. An animal trap comprising a body, a wooden frame applied to an end portion of the body and having the extremity of the latter bent to overlie the face of the frame, fastenings driven into the wooden frame and securing the body thereto and a metal casing protecting the inner side of the wooden frame.

2. An animal trap, a body, a frame at one end of the body and provided with an entrance opening, pointed rods passing through the frame and inwardly converged and having their outer ends bent to lie against the frame, loop stays attached at their outer ends to the frame and a ring supported in the bight of the stays and having the pointed rods passing therethrough.

In testimony whereof I affix my signature in presence of two witnesses.

GEORGE F. CORLE.

Witnesses:
A. WESNER,
CHESTER CHRITTON.